US009273506B1

(12) United States Patent
Beck

(10) Patent No.: US 9,273,506 B1
(45) Date of Patent: Mar. 1, 2016

(54) DEVICE FOR OPENING AND CLOSING THE DISCHARGE DOOR OF A BULK SEED BOX

(71) Applicant: Tom J. Beck, Clarks, NE (US)

(72) Inventor: Tom J. Beck, Clarks, NE (US)

( * ) Notice: Subject to any disclaimer, the term of this patent is extended or adjusted under 35 U.S.C. 154(b) by 330 days.

(21) Appl. No.: 13/941,612

(22) Filed: Jul. 15, 2013

(51) Int. Cl.

| | |
|---|---|
| ***E05F 15/00*** | (2015.01) |
| ***E05F 3/00*** | (2006.01) |
| ***E05F 1/00*** | (2006.01) |
| ***B65G 65/34*** | (2006.01) |
| ***B65G 65/04*** | (2006.01) |
| ***E05F 15/14*** | (2006.01) |
| *B65D 88/28* | (2006.01) |

(52) U.S. Cl.
CPC .................................... *E05F 15/148* (2013.01)

(58) Field of Classification Search
CPC ................ B66F 3/00; B66F 3/08; B66F 3/14; B66F 5/02; B66F 5/025; B66F 7/025; B66F 7/12; B65D 88/28; B65F 65/04; B65F 65/34; Y10T 16/593; Y10T 16/56; Y10T 16/568
USPC .......... 254/93 R, 2 B, 100, 134; 49/339, 324, 49/340, 344; 414/411, 414; 318/671, 560
See application file for complete search history.

(56) References Cited

U.S. PATENT DOCUMENTS

| | | | | |
|---|---|---|---|---|
| 5,094,356 | A | 3/1992 | Miller | |
| 5,845,799 | A | 12/1998 | Deaton | |
| 5,997,118 | A * | 12/1999 | McBrayer et al. | 312/334.44 |
| 6,010,022 | A | 1/2000 | Deaton | |
| 7,086,342 | B2 | 8/2006 | O'Neall | |
| 7,458,629 | B2 * | 12/2008 | Smith et al. | 296/100.18 |
| 8,137,043 | B2 * | 3/2012 | Beck | 414/414 |
| 8,899,553 | B2 * | 12/2014 | Hickerson | 254/133 R |
| 2001/0044986 | A1 * | 11/2001 | Wilkins | 16/325 |
| 2003/0091417 | A1 * | 5/2003 | Swann | 414/458 |
| 2014/0056673 | A1 * | 2/2014 | Zindel | 414/288 |

* cited by examiner

*Primary Examiner* — Joseph J Hail
*Assistant Examiner* — Jon Taylor
(74) *Attorney, Agent, or Firm* — Dennis L. Thomte; Thomte Patent Law Office LLC

(57) ABSTRACT

A device is described for opening and closing the discharge door of a bulk seed box. The device comprises a portable lightweight structure which is attached to the box and which uses an electrically operated screw actuator or linear actuator to move the discharge door of the box from its closed position to its open position and vice versa. The device is preferably remotely controlled.

8 Claims, 5 Drawing Sheets

DEVICE FOR OPENING AND CLOSING THE DISCHARGE DOOR OF A BULK SEED BOX

BACKGROUND OF THE INVENTION

1. Field of the Invention

This invention relates to a device for opening and closing the discharge door of a bulk seed box and more particularly to a device which utilizes an electrically operated screw actuator or linear actuator to open and close the discharge door.

2. Description of the Related Art

Bulk seed systems have been in wide use for many years to eliminate the need for filling row planter boxes and grain drills with seed from individual bags. A popular type of bulk seed box is that which is manufactured by Buckhorn, Inc. of Milford, Ohio, who is the owner of U.S. Pat. Nos. 5,845,799 and 6,010,022 relating to bulk seed boxes. Pioneer Hi-Bred International, Inc. of Johnston, Iowa, markets agricultural seeds in large bulk seed boxes under the registered trademark PROBOX®. See also U.S. Pat. Nos. 5,094,356 and 7,086,342 which disclose bulk seed boxes having discharge doors or slide gates.

The bulk seed boxes of Buckhorn, Inc. and Pioneer have a sliding discharge door at the lower ends thereof through which the seed in the bulk seed box is dumped into a seed system, wagon, truck, etc. When the large bulk seed boxes are delivered to a farmer or the like, the bulk seed box is normally elevated above the ground by means of a forklift or a front end loader so that the contents of the bulk seed box may be dumped into a seed system/wagon/truck so that the seed may be conveyed therefrom into the planting devices. The fact that the bulk seed boxes are elevated above the truck or the like requires that a person climb upwardly on the truck or a ladder to manually open the discharge door. Further, the weight of the seed in the box sometimes causes the bulk seed box to slightly deform which makes it extremely difficult to manually open or close the discharge door. Applicant's invention described and shown in U.S. Pat. No. 8,137,043 issued Mar. 20, 2012 represents a vast improvement in the art. The instant invention represents a further improvement in the art.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A lightweight portable device for opening and closing the discharge door of a bulk seed box is disclosed which is removably secured to the lower end of the bulk seed box while the bulk seed box is on the ground or other suitable supporting surface. The inner end of the device of this invention is selectively removably inserted into openings in the lower end of the bulk seed box at opposite sides of the discharge door. The device includes an electrically operated screw actuator or linear actuator which has a generally C-shaped connector mounted on the outer end of the actuator rod thereof which is selectively removably connected to the discharge door and which will pull the discharge door from its closed position to its open position as the actuator rod of the screw actuator is retracted. The C-shaped connector may also be used to push the discharge door from its open position to its closed position upon the extension of the actuator rod of the screw actuator.

The device may be remotely controlled which eliminates the need for a person to climb up on a truck or ladder to manually operate the discharge door.

It is therefore a principal object of the invention to provide a device for opening and closing the discharge door of a bulk seed box.

A further object of the invention is to provide a device of the type described which includes an electrically operated screw actuator for moving the discharge door of the bulk seed box between its closed and open positions and vice versa.

Still another object of the invention is to provide a device for opening and closing the discharge door of a bulk seed box which may be remotely operated.

Yet another object of the invention is to provide a device for opening and closing the discharge door of a bulk seed box which is portable and lightweight.

These and other objects will be obvious to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
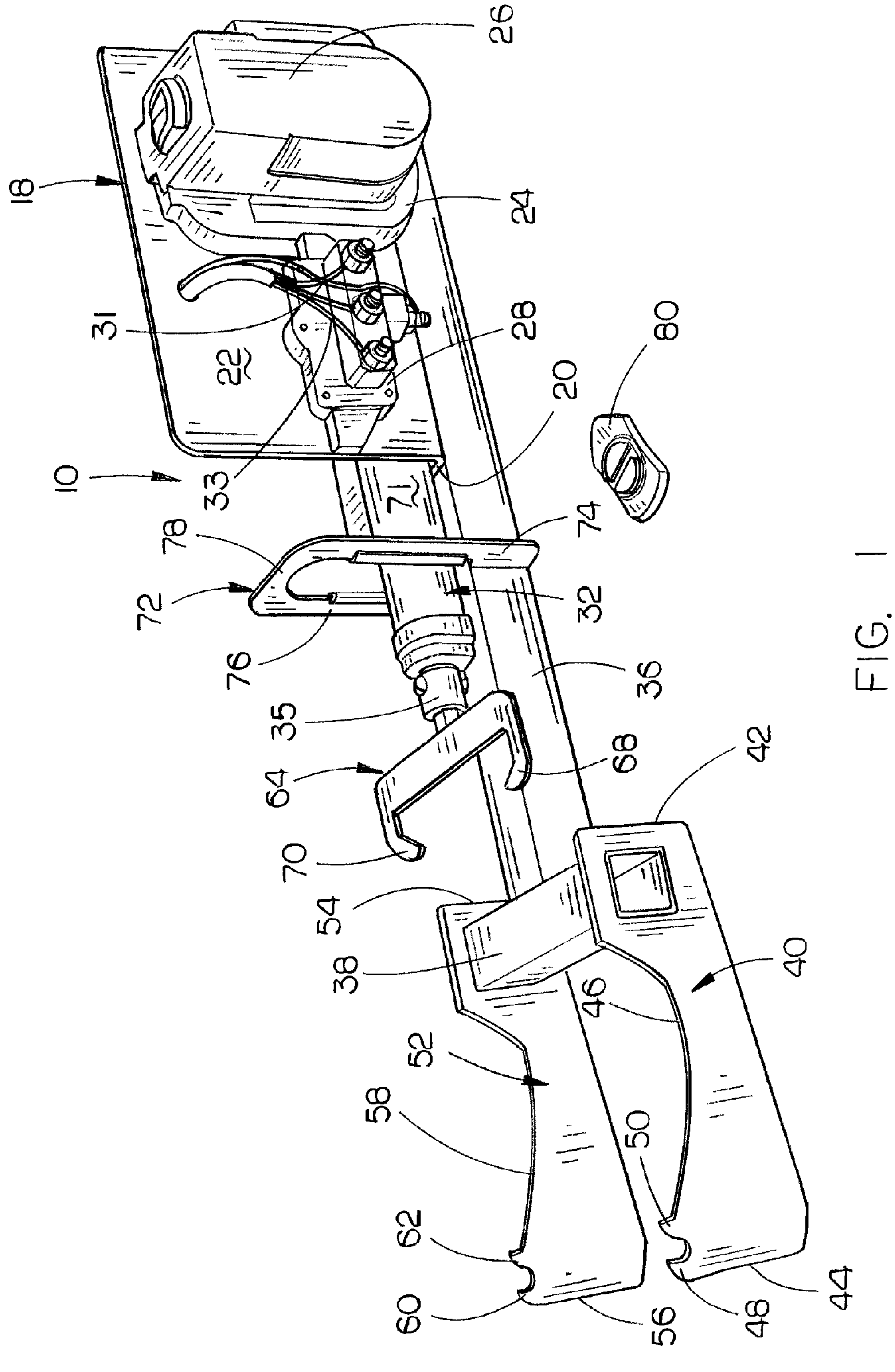
FIG. 1 is a perspective view of the device of this invention with the actuator rod of the screw actuator being in its retracted position.
Figure 2:
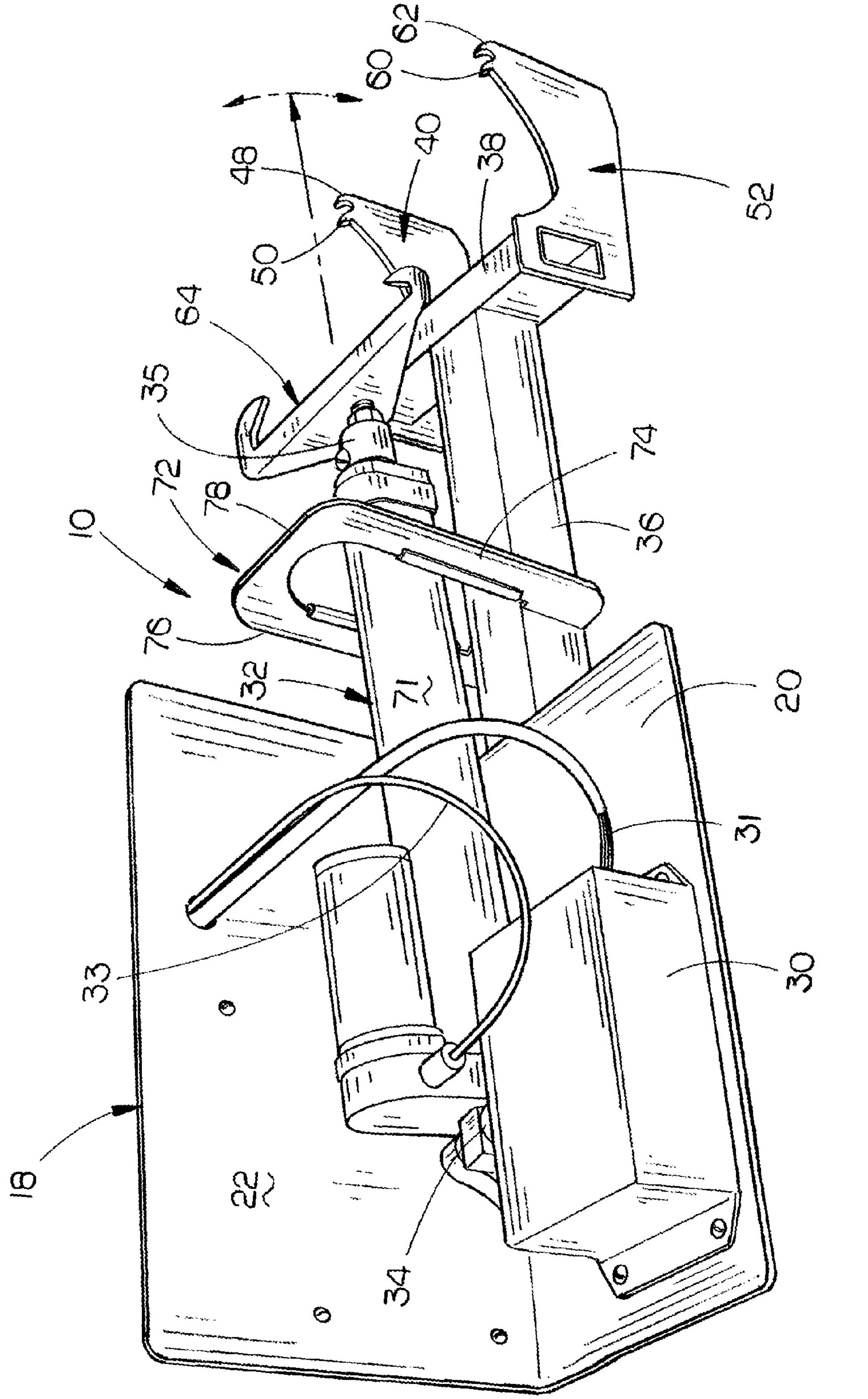
FIG. 2 is another perspective view of the device of this invention with the actuator rod of the screw actuator being in its retracted position.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the door opening and closing device of this invention which is designed to open and close the sliding discharge door 12 of a bulk seed box 14 such as disclosed in U.S. Pat. Nos. 6,010,022 and 5,845,799, the disclosures of which are incorporated by reference thereto. In the '022 patent, the sliding door is identified as a cutoff device 50 which selectively closes the outlet 60 in the bottom wall of the base. In the '799 patent, the sliding discharge door is referred to as a cutoff device or flow control valve 89.

Device 10 includes a frame or support 18 which is shown to be L-shaped with a bottom plate 20 and an upstanding side plate 22. It should be noted that the support 18 could have other shapes as well. A conventional battery receptacle 24 is mounted on the outer side of plate 22 and is adapted to selectively removably receive a rechargeable battery 26 which in this case of the particular device is an 18-volt rechargeable battery such as marketed by Black & Decker. When positioned in receptacle 24, the battery 26 is electrically connected to the electrical circuitry of the receptacle 24 in conventional fashion. Electrical leads 27 extend from receptacle 24 which are connected to a terminal block 28 which may include a transformer if necessary.

Terminal block 28 is electrically connected to a controller 30, by leads 31, which includes an RF receiver. Terminal block 28 is electrically connected to an electrically driven screw actuator 32 or linear actuator, by leads 33, the base of which is pivotally secured to bottom plate 20, about a horizontal axis, at 34. Screw actuator 32 includes an extendable and retractable actuator rod 35.

An elongated support 36 has its rearward end secured to the underside of plate 20 and extends forwardly therefrom. Support 38 is secured to the forward end of support 36 so as to be transversely disposed with respect thereto.

The numeral 40 refers to a vertically disposed plate having a rearward end 42 and a forward end 44. As seen, the upper end of plate 40 is curved at 46. The upper forward end of plate 40 has a pair of hooks 48 and 50 provided thereon.

The numeral 52 refers to a vertically disposed plate having a rearward end 54 and a forward end 56. As seen, the upper end of plate 52 is curved at 58. The upper forward end of plate 52 and has a pair of hooks 60 and 62 extending upwardly therefrom. As seen, plates 40 and 52 are welded to the ends of support 38.

A horizontally disposed C-shaped connector 64 is secured to the outer end of rod 35 of screw actuator 32 and has hooks 68 and 70 at the opposite ends thereof. As seen, the body 71 of screw actuator 32 extends through a handle 72 which includes side portions 74 and 76 and an upper portion 78. The handle 72 not only provides a handle but also serves as a limit to the upward pivotal movement of the screw actuator 32 with respect to the support 36.

Figure 3:
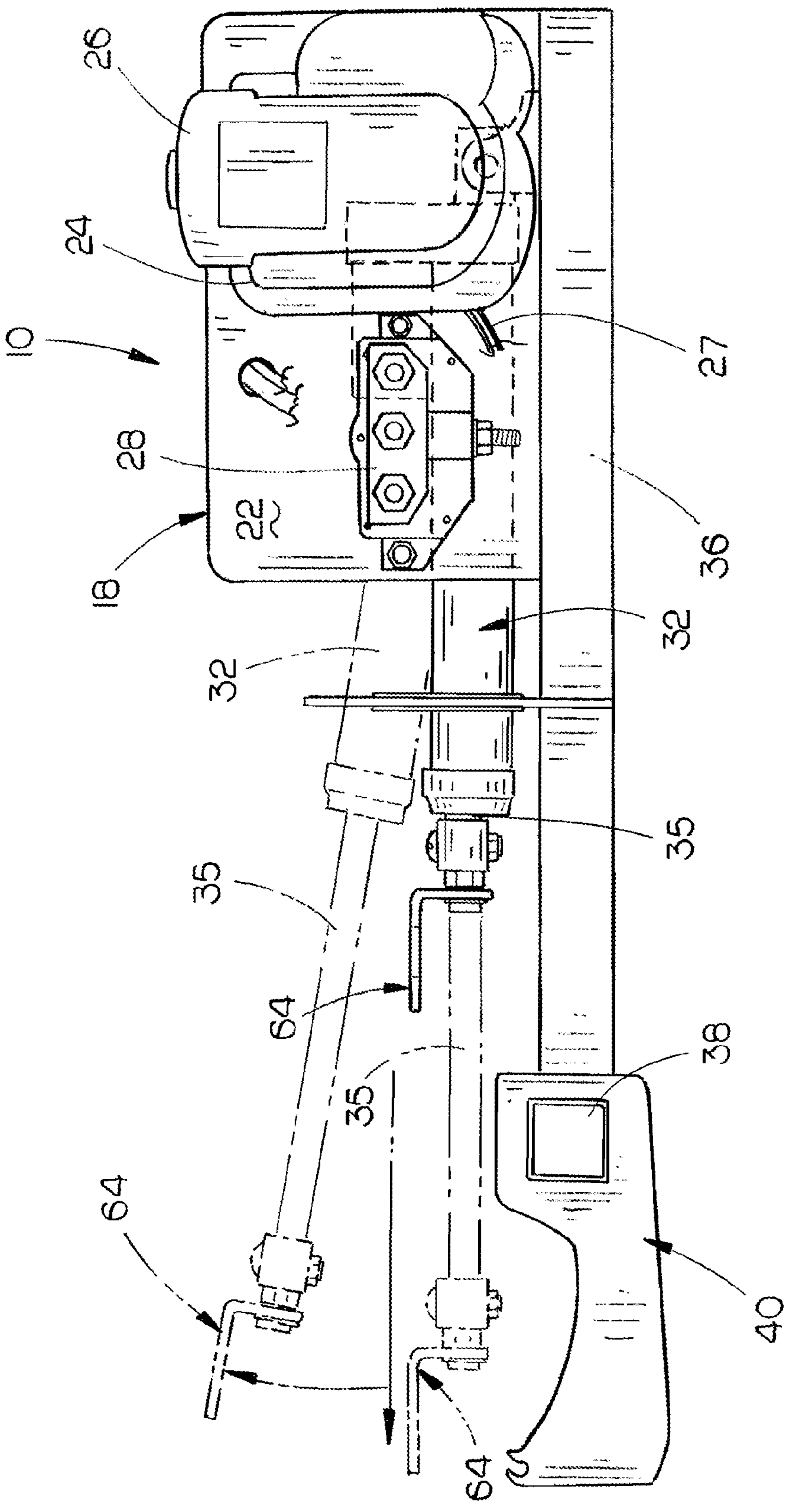
FIG. 3 is a side elevational view of the device of this invention with broken lines illustrating the screw actuator in its extended position and in its elevated position.
Figure 4:
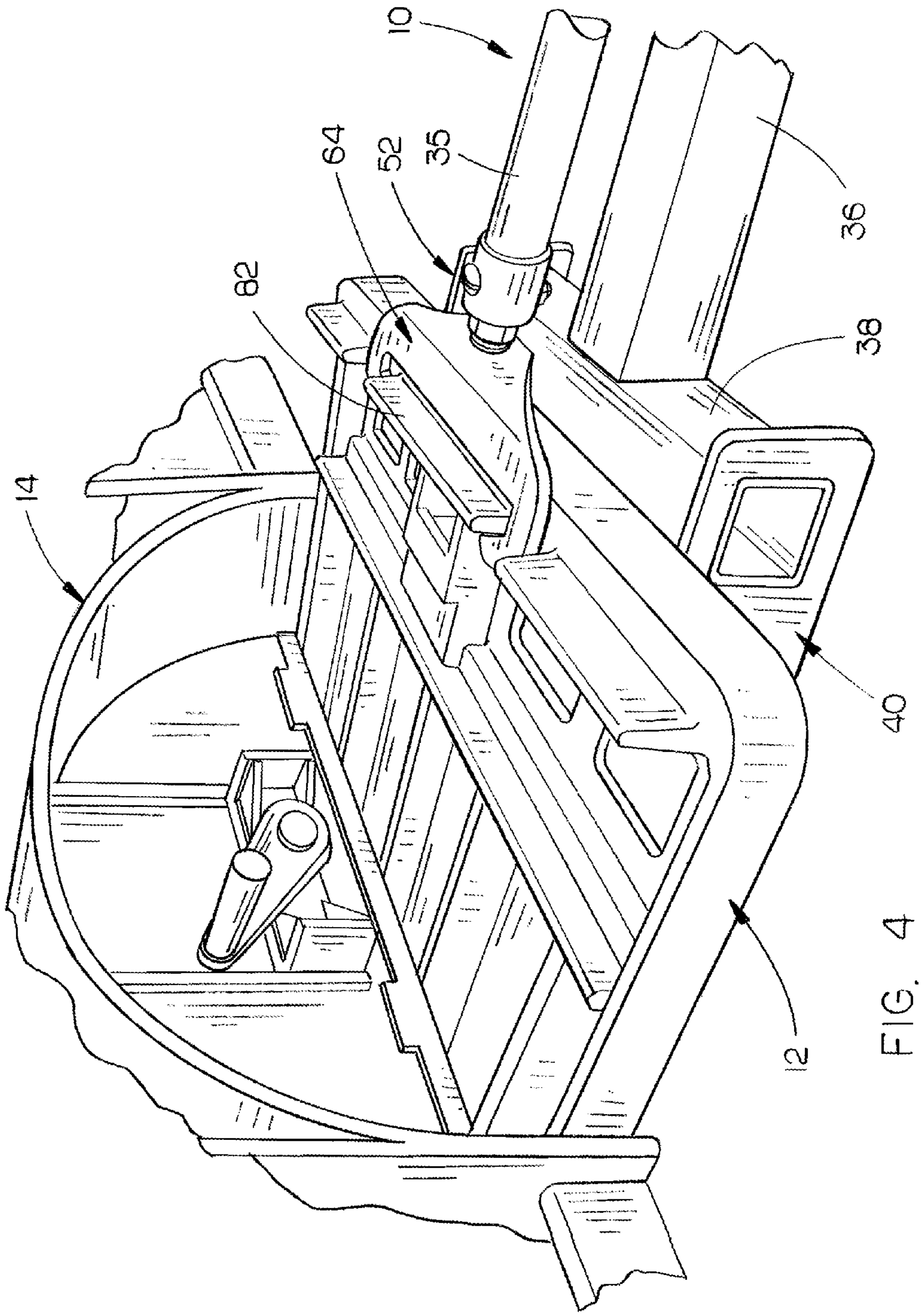
FIG. 4 is a partial perspective view illustrating the C-shaped connector of the device being connected to the discharge door of a bulk seed box.
Figure 5:
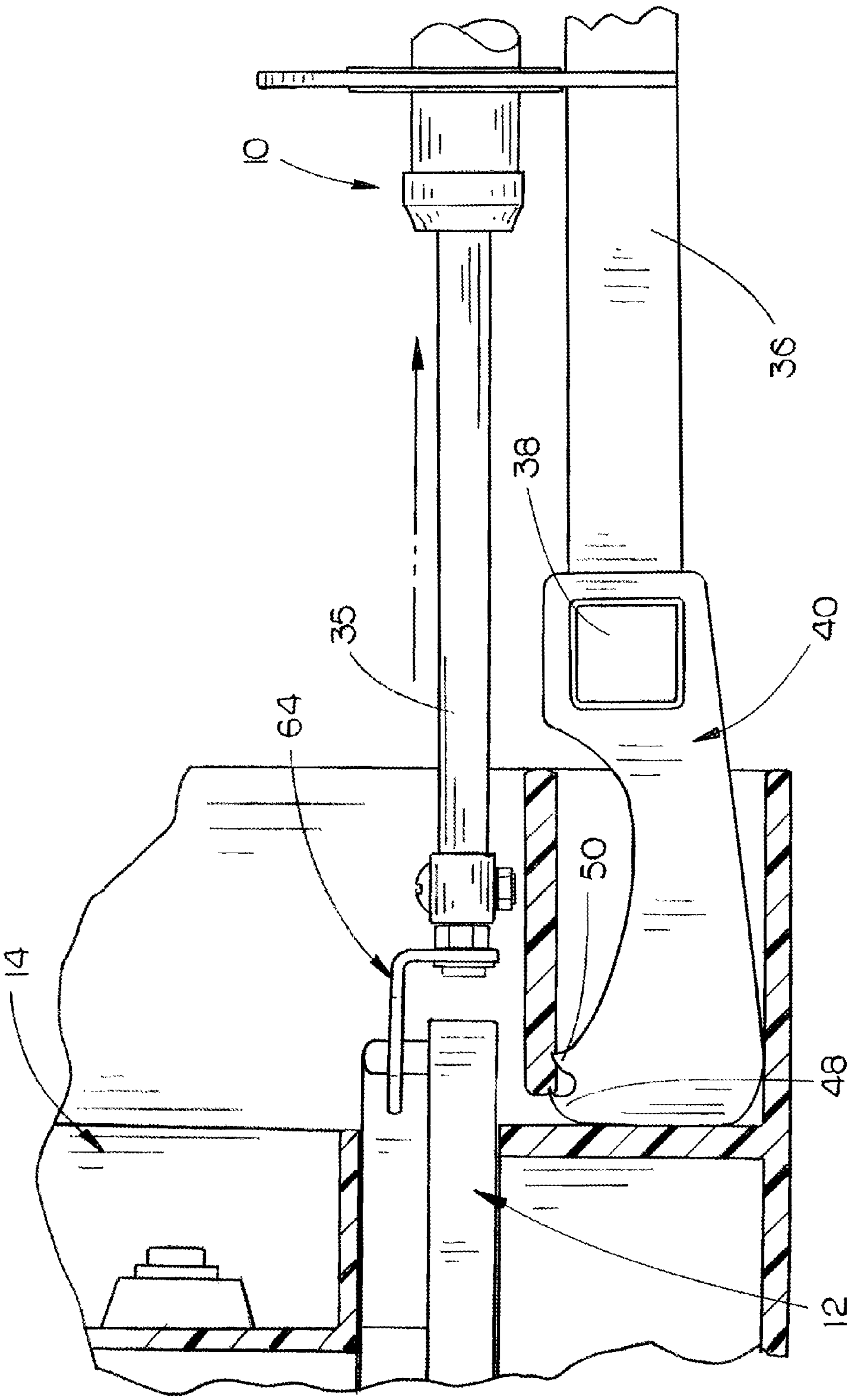
FIG. 5 is a partial sectional view illustrating the C-shaped connector of the device connected to the bulk seed box and the discharge door thereof.

The device 10 is used as follows. When the filled bulk seed box 14 is on the ground or other suitable supporting surface, the plates 40 and 52 are extended inwardly through openings in the bulk seed box 14 at opposite sides of the discharge door 12. The rearward end of the device 10 is then moved downwardly, which is enhanced by the weight of the device 10, so that the hooks 48, 50 and 60, 62 on the upper forward ends of the plates 40 and 52 respectively move upwardly into engagement with the bulk seed box 14 to hold the device 10 in place. At this time, the screw actuator 32 will usually be in its retracted position. The forward end of actuator 32 will then be pivotally moved upwardly to the uppermost dotted line position of FIG. 3. The remote controller fob 80, which is an RF transmitter, will then be actuated to extend the actuator rod 35 to the upper dashed line position of FIG. 3 to position the connector 64 over the central upstanding wall portion 82 of discharge door 12. The connector 64 is then lowered to engage the wall portion 82.

The bulk seed box 14 may then be raised upwardly by a front-end loader or the like. When the box 14 is properly positioned over a seed system wagon, truck, or the like, the fob 80 will be actuated to cause the actuator rod 35 of actuator 32 to be retracted which will cause the discharge door to be opened. When the seed has been discharged from the box 14, the fob 80 may be again activated to cause the actuator rod 35 to be extended from actuator 32 which will cause the connector 64 to push the discharge door 12 to its closed position. The instant invention is lightweight, portable and easy to operate.

Although the device 10 has been described as being used to open and close the discharge door 12 of a bulk seed box 14 which is to be elevated above a seed system wagon, truck or the like, the device 10 may also be used to open and close the discharge door 12 of a bulk seed box which is positioned on a seed tender such as shown in U.S. Pat. Nos. 6,971,324 and 6,994,039.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A portable hand-held device for opening and closing a discharge door, having an inner end, an outer end, and opposite sides, which is horizontally slidably mounted at the lower end of a bulk seed box having an opening formed therein at each of the opposite sides of the discharge door adjacent the outer end thereof, the discharge door being movable between closed and open positions, comprising:

a support frame having a forward end and a rearward end;

a rechargeable DC battery mounted on said support frame;

an RF receiver mounted on said support frame;

a controller mounted on said support frame which is electrically connected to said battery and which is connected to said RF receiver;

an electrically driven screw actuator having a body with a retractable and extendable actuator rod movably extending therefrom;

said actuator being electrically connected to said controller;

said body including a base which is pivotally secured about a horizontal axis to said support frame so that said screw actuator may be pivotally raised and lowered with respect to said support frame;

an elongated and horizontally disposed first support having rearward and forward ends;

said rearward end of said first support being secured to said support frame and extending forwardly therefrom;

an elongated and horizontally disposed second support having first and second ends;

said second support being secured to said forward end of said first support so as to be transversely disposed with respect to said first support;

a vertically disposed first plate having a forward end, a rearward end, an upper end and a lower end;

said rearward end of said first plate being secured to said first end of said second support and extending forwardly therefrom;

a vertically disposed second plate having a forward end, a rearward end, an upper end, and a lower end;

said rearward end of said second plate being secured to said second end of said second support and extending forwardly therefrom;

said first and second plates being configured to be inserted into the openings on the seed box at the sides of the sliding discharge door;

said first and second plates being configured to engage the seed box to hold the device in place;

a generally C-shaped door engaging member secured to the outer end of said actuator rod;

said C-shaped door engaging member being configured to engage the discharge door whereby the retraction of said actuator rod will cause the discharge door to be slidably moved to its open position and so that extension of said actuator rod will cause the discharge door to be moved to its closed position; and an RF transmitter located remotely of the device for transmitting signals to said RF receiver whereby the discharge door may be opened and closed from a position remote from the device.

2. The device of claim 1 wherein each of said first and second plates has an arcuate recessed portion formed in said upper end thereof at said forward end thereof for engagement with the seed box to hold the device in place.

3. The device of claim 1 wherein said forward end of said first plate has at least one hook extending upwardly from its said forward end and wherein said forward end of said second plate has at least one hook extending upwardly from its said forward end with said hooks configured to engage the seed box to hold the device in place.

4. The device of claim 3 wherein said hooks also extend rearwardly from said forward ends of said first and second plates.

5. A portable hand-held device for opening and closing a discharge door, having an inner end, an outer end, and opposite sides, which is horizontally slidably mounted at the lower end of a bulk seed box having an opening formed therein at each of the opposite sides of the discharge door adjacent the outer end thereof, the discharge door being movable between closed and open positions, comprising:

a support frame having a forward end and a rearward end;

a rechargeable DC battery mounted on said support frame;

an RF receiver mounted on said support frame;

a controller mounted on said support frame which is electrically connected to said battery and which is connected to said RF receiver;

an electrically driven linear actuator having a body with a retractable and extendable actuator rod movably extending therefrom;

said body including a base which is pivotally secured about a horizontal axis to said support frame so that said linear actuator may be pivotally raised and lowered with respect to said support frame;

an elongated and horizontally disposed first support having rearward and forward ends;

said rearward end of said first support being secured to said support frame and extending forwardly therefrom;

a vertically disposed first plate having a forward end, a rearward end, an upper end and a lower end;

said rearward end of said first plate being operatively secured to the forward end of said first support;

a vertically disposed second plate having a forward end, a rearward end, an upper end and a lower end;

said rearward end of said second plate being operatively secured to the forward end of said first support and being horizontally spaced from said first plate;

said first and second plates being configured to be inserted into the openings on the seed box at the sides of the sliding discharge door;

said first and second plates being configured to engage the seed box to hold the device in place;

a generally C-shaped door engaging member secured to the outer end of said actuator rod;

said C-shaped door engaging member being configured to engage the discharge door whereby the retraction of said actuator rod will cause the discharge door to be slidably moved to its open position and so that extension of said actuator rod will cause the discharge door to be moved to its closed position; and an RF transmitter located remote of the device for transmitting signals to said RF receiver whereby the discharge door may be opened and closed from a position remote from the device.

6. The device of claim 5 wherein each of said first and second plates has an arcuate recessed portion formed in said upper end thereof at said forward end thereof for engagement with the seed box to hold the device in place.

7. The device of claim 5 wherein said forward end of said first plate has at least one hook extending upwardly from its said forward end and wherein said forward end of said second plate has at least one hook extending upwardly from its said forward end with said hooks configured to engage the seed box to hold the device in place.

8. The device of claim 7 wherein said hooks also extend rearwardly from said forward ends of said first and second plates.

* * * * *